United States Patent [19]

Erickson

[11] Patent Number: 4,733,956

[45] Date of Patent: Mar. 29, 1988

[54] MIRROR SAFETY SYSTEM FOR VIEWING THE REAR SEAT OF AN AUTOMOBILE

[76] Inventor: Frank A. Erickson, 2527 Lofty View Dr., Torrance, Calif. 90505

[21] Appl. No.: 935,780

[22] Filed: Nov. 28, 1986

[51] Int. Cl.$^4$ .............. B60R 1/04; B60R 1/08; G02B 7/18; G02B 5/10

[52] U.S. Cl. .................... 350/624; 350/623; 350/618; 350/632; 248/467; 248/549; 248/900

[58] Field of Search ............ 350/623, 624, 618, 631, 350/632, 612, 604, 639; 248/467, 475.1–483, 549, 900

[56] References Cited

U.S. PATENT DOCUMENTS

| | | | |
|---|---|---|---|
| 167,585 | 9/1875 | Stephenson | 350/631 |
| 1,663,672 | 3/1928 | Therasse | 248/479 |
| 1,892,365 | 12/1932 | Rowan | 248/479 |
| 2,146,859 | 2/1939 | Seklehner | 248/467 |
| 2,197,280 | 4/1940 | Topping | 248/467 |
| 2,652,648 | 9/1953 | Morley | 248/483 |
| 2,856,814 | 10/1958 | Dillmann | 248/467 |
| 2,880,651 | 4/1959 | Fenyo | 248/467 |
| 4,359,266 | 11/1982 | Rohlf et al. | 350/604 |
| 4,549,790 | 10/1985 | Harris | 350/632 |
| 4,624,539 | 11/1986 | King et al. | 350/632 |

FOREIGN PATENT DOCUMENTS 2838525 3/1980 Fed. Rep. of Germany ...... 350/626

*Primary Examiner*—Jon W. Henry
*Attorney, Agent, or Firm*—Roger A. Marrs

[57] ABSTRACT

A mirrored system and components therefor are disclosed herein for use in an automobile having front and rear seats covered by a roof structure from which a rear view mirror and a forward facing mirror downwardly depend in fixed spaced apart optical alignment relationship. The mirrors are adjustable to accommodate an optical line of sight from the driver's position on the front seat to an infant's position on the rear seat. The forward facing mirror is removably mounted by a suction cup attachment to roof structure or rear window by a base that carries a dome type mirror on a backing plate by a resilient metal band. A screw adjustment connects one end of the band to the base while the other end of the band adhesively adheres to the mirror backing plate.

1 Claim, 4 Drawing Figures

MIRROR SAFETY SYSTEM FOR VIEWING THE REAR SEAT OF AN AUTOMOBILE

BACKGROUND OF THE INVENTION

1. Field of the Invention

The present invention relates to the field of auto safety and more particularly to a novel optical system permitting the driver of a vehicle to observe the position and condition of an infant occupant on the rear seat.

2. Brief Description of the Prior Art

It is the current practice in infant safety to place the infant's safety seat on the rear seat of the vehicle and to strap the safety seat in position with the infant facing rearward. Since most infant safety seats include a high back, the infant is not readily visible to the driver of the vehicle and, in many instances, is not readily visible to the occupant of the vehicle adjacent to the driver. Since the position and condition of the infant is not observable by occupants of the front seat, the infant's needs and condition are not readily discernible. Also, the infant has difficulty in observing or relating to the occupants of the front seat while in its rear-facing safety seat buckled to the rear seat of the vehicle.

Although the driver or passenger in the front seat oftentimes has attempted to use either the rearview mirror or the visor mirror to observe the infant so positioned on the rear seat, such practice is awkward, cumbersome and does not permit ready convenience for such a procedure.

Therefore, an existing need has arisen to provide a safety optical system whereby the occupants of the front seat may readily observe an infant occupant in the rear seat while in its safety seat. Such a system should be static or fixed so that it does not need special adjustment in order to observe the rear seat area. Also, the system should include components which may be readily usable in connection with existing optical units within the vehicle and should be able to be disassembled or disconnected from the vehicle when not in use.

SUMMARY OF THE INVENTION

Accordingly, the above problems and difficulties are obviated by the present invention which provides a novel optical system for observing an infant occupant in its safety seat when buckled to the rear seat of a vehicle which comprises a pair of mirrors downwardly depending from the roof structure or rear window of the vehicle and in alignment so that an optical axis is established permitting the driver or passenger in the front seat to observe the infant occupant of the rear seat. In one form of the invention, the optical system takes the form of an adjustable rear view mirror placed immediately ahead of the occupants in the front seat and an intermediate mirror which is forward facing detachably carried immediately behind the rear seat of the vehicle. The mirror of the forward facing mirror is of a dome-type so that the reflected image of the infant occupant of the rear seat is transmitted to the rear view mirror or visor mirror ahead of the front seat for viewing by the front seat occupants.

The forward facing mirror may comprise not only the dome-shape of the mirror itself but a base mounting which includes a suction cup for removable attachment to the edge marginal region of the rear window or to the adjacent roof structure and a resilient metal band having its opposite ends connected to the back of the dome-type mirror and the suction cup respectively. An adjustment means attaches the end of the band to the base so that the mirror may be properly aligned to establish the required optical axis and alignment between the viewers in the front seat and the viewed infant in the rear seat.

Therefore, it is among the primary objects of the present invention to provide a novel optical safety system whereby an infant occupant in the rear seat may be observed by the driver or the passenger in the front seat with convenience and ease.

Another object of the present invention is to provide a novel safety optical system for viewing an infant occupant in the rear seat which may be readily adjustable so that persons in the front seat have ready access to viewing the infant without body distortion or unusual head movement.

Yet another object of the present invention is to provide a relatively inexpensive system using existing mirrors in an auto vehicle in combination with a detachably mounted mirror so that persons in the front seat can readily observe an infant in a rearward facing safety seat with ease and convenience.

Yet another object of the present invention is to provide a novel component of an optical safety system which is a suction cup mounted dome-type mirror that is readily adjustable with respect to a base so as to be a part of an optical alignment system for remotely viewing the back seat area of a vehicle from the front seat.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
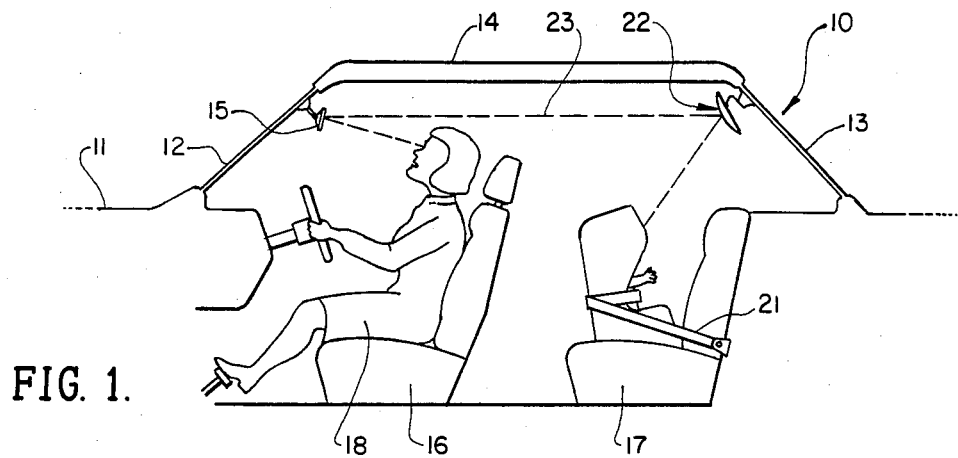
FIG. 1 is a diagrammatic illustration of a vehicle incorporating the novel safety optical system of the present invention whereby the occupant of the front seat may view an infant occupant in the rear seat in accordance with the present invention.

Referring to FIG. 1, a conventional automobile is illustrated in the general direction of arrow 10 which includes a body 11 having a front windshield 12 and a rear windshield 13 which are connected together by a roof structure 14. As is the conventional practice, a rear view mirror 15 is illustrated attached to the inside of the front windshield 12 and the interior is further provided with a front seat 16 as well as a rear seat 17. The front seat is illustrated as being occupied by a driver 18 while an infant car seat 20 is illustrated in a rearward facing position on the rear seat 17. This orientation of a baby or infant seat is conventional and the infant seat is releasably retained on the rear seat 17 by means of a safety belt and buckle arrangement 21. Such a conventional infant seat generally includes a high back against which the infant rests and the infant faces rearwardly with side panels carried on the infant seat back that substantially enclose the infant in its seated position. Such an arrangement is extremely difficult for anyone sitting in the front seat to observe the infant. Also, the infant is rather solitary and cannot observe or is unaware of the presence of other persons in the vehicle. Although such a seating arrangement may be extremely safe for the infant, it does not provide comfort to those in the front seat who wish to observe the position and condition of the infant.

The mirrored safety system of the present invention makes use of the rearward facing mirror 15 by placing an auxiliary safety mirror 22 along an optical axis permitting viewing by the front-seated passengers of the infant in the seat 20. It can be seen that the optical axis represented by broken line 23 extends from the eyes of the observer to the rearrward facing mirror 15 and then to the forward facing safety mirror 22 which reflects the image of the child or infant in the seat 20. The optical axis is unbroken and does not require the front seat occupant to turn his head or to dislodge his body from a normal driving position. Therefore, full concentration by the driver is uninterrupted. Even use of the rearward facing mirror 15 is conventional as the safety mirror 22 does not obscure or obstruct viewing through the rear window 13. It should also be noted in place of the conventional rear view mirror 15, a mirror on the back of a standard visor adjacent to the juncture of the roof structure 14 with the upper edge of the window 12 may be used. Both mirrors are fully articulated so that adjustment to provide the proper optical axis can be obtained. The same kind of articulation or adjustment is available for the mirror 22 as well.

Figure 2:
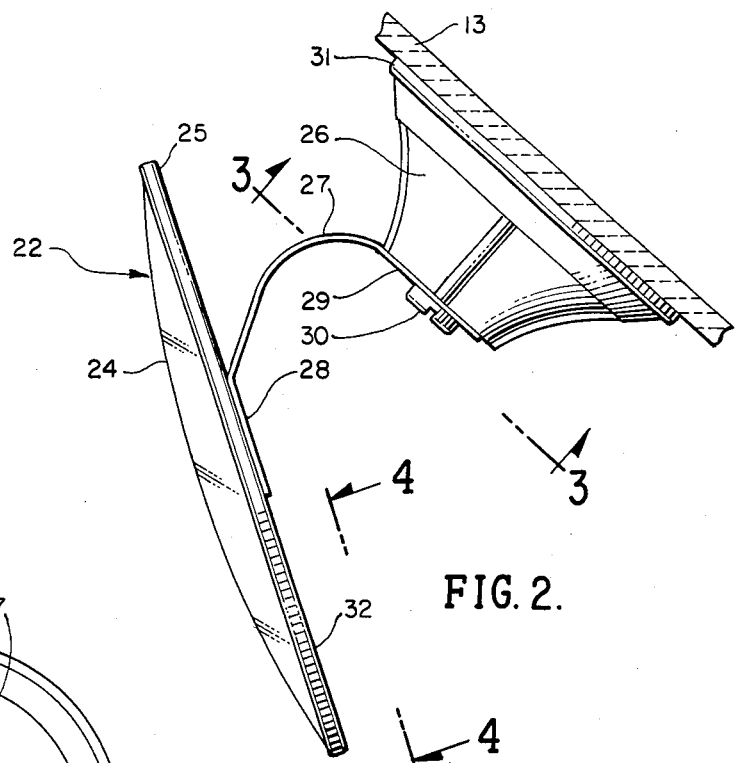
FIG. 2 is an enlarged side elevational view of the forward facing mirror used in the optical system of FIG. 1.

Referring now in detail to FIG. 2, the auxiliary safety mirror 22 is illustrated in detail wherein it can be seen that the mirror includes a dome-type reflective surface 24 which is carried on a backing plate 25. The mirror and backing plate are outwardly cantilevered from a base 26 by means of a resilient metal band 27 having opposite ends. One end is adhesively attached to the back of backing plate 25 and is represented by numeral 28 while its opposite end 29 is adjustably carried or attached to the base 26 by an adjusting screw 30. The mirror 24 may be adjusted to a proper angle by loosening of the screw 30 and by moving band end 29 with respect to the base to achieve the proper orientation to complete the optical axis 23. The base 26 is of frustroconical configuration and is provided with external ribbing for strength purposes. The side of the base opposite to its side carrying the adjustment screw and band end 29 is provided with a resilient suction cup 31 for releasable attachment to the inner surface of the rear window 13. It is to be understood that attachment may be placed along the upper edge marginal region of window 13 or to the marginal region of the roof structure 14 connected to the upper side of the window 13. Inasmuch as both the rear facing mirror 15 and the auxiliary safety mirror 22 are carried on the inside surface of the front and rear windows 12 and 13, the mirrors may be said to downwardly depend therefrom as the windows are substantially angled with respect to a vertical axis. Such an arrangement maintains the mirrors out of the vehicle occupants' way during ingress or egress to and from the vehicle. It is an important feature of the invention that the mirrors of the safety system be located so as not to interfere with normal usage of the vehicle.

Figure 3:
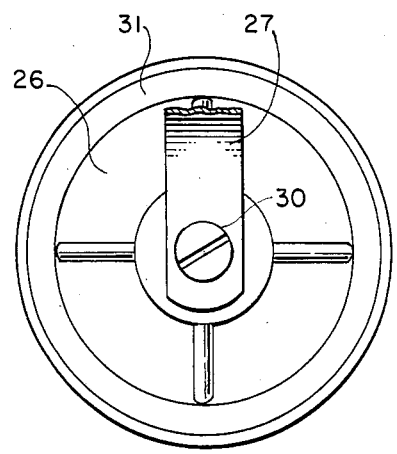
FIG. 3 is a cross-sectional view of the forward facing mirror shown in FIG. 2 as taken in the direction of arrows 3—3 thereof.

Referring now in detail to FIG. 3, it can be seen that the base and suction cup 26 and 31 respectively are substantially circular. The circular configuration is also extended to the mirror 24, although other geometrical shapes are envisioned. Furthermore, the adjustment screw 30 include a slot or other means such as a wing screw arrangement so that ready adjustment of the mirror and band 27 with respect to the base can readily be achieved.

Figure 4:
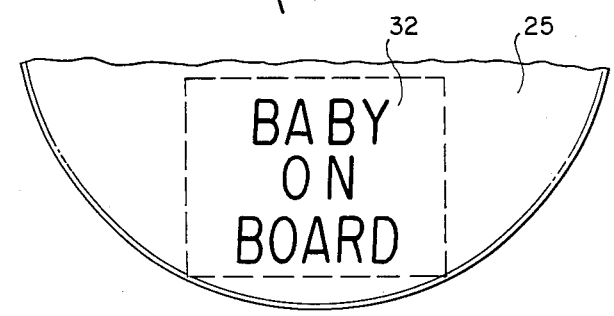
FIG. 4 is a fragmentary view of the rear of the mirror shown in FIG. 2 as taken in the direction of arrows 4—4 thereof.

Referring now in detail to FIG. 4, it is to be particularly noted that the rear surface of the backing plate 25 includes an area 32 suitable for display of indicia or graphic subject matter. Such an area may be used for advertising purposes, special messages or suitable pictorial presentations. A feature of the invention is that the display area 32 is visible through the rear windshield 13 to persons behind the vehicle. Therefore, the area 32 is tied directly into the usage and function of the mirror system as a safety medium or protective system for the infant and vehicle occupants.

Therefore, in view of the foregoing, it can be seen that the novel mirrored optical system of the present invention provides a safety means for observing the position and condition of an infant occupant in a rear facing infant seat such as seat 20 while strapped in a vehicle. The occupants of the front seat need not turn their heads rearwardly nor reposition themselves from a normal riding position on the front seat in the vehicle. Their eyes merely have to glance at either the rear view mirror 15 or a visor mirror along the front roof line in order to view the image of the infant via the mirrored surface 24 of the mirror 22. Likewise, an alert infant or child can also view the occupants of the front seat by looking into the mirror 24 to observe the reflection of images of occupants in the front seat. This is soothing and reassuring to the infant or child in the seat 20. Simultaneously, the message or graphic subject matter carried on the display surface 32 is observable to persons at the rear of the vehicle 10 through the rear window 13.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. In an automobile having a front and a rear seat and a front and rear window joined at their upper edges by a roof structure so as to define a closed compartment intended to be occupied by passengers, the improvement which comprises:
a safety optical system for viewing said rear window;
a rear facing mirror carried on said front window;
a front facing mirror carried on said rear window;
an optical axis established from said front seat to said rear seat via said rear facing mirror and said front facing mirror;
said front facing mirror having adjustment means for movably aligning with respect to said rear facing mirror for viewing a selected area of said rear seat;
said front facing mirror is convex and said rear facing mirror is substantially flat;

said front facing mirror comprises:
a backing plate mounting said convex mirror from one side;
a base having a suction cup removably carried on said rear window;
an elongated pliable band of fixed length having opposite ends attached to said backing plate and said base respectively permitting relative movement between said backing plate and said base and serving as a shock absorber;
said adjustment means includes a screw fastener selectively coupling one end of said band to said base;
said backing plate includes a display area carrying indicia thereon; and
said display area being unobscured by said base for visual observation through said rear window.

* * * * *